US006992843B2

(12) United States Patent
Juhala

(10) Patent No.: US 6,992,843 B2
(45) Date of Patent: Jan. 31, 2006

(54) PRECISION OPTICAL WEDGE LIGHT BEAM SCANNER

(75) Inventor: Roland Edwin Juhala, Lake Sherwood, MO (US)

(73) Assignee: Metastable Instruments, Inc., St. Charles, MO (US)

( * ) Notice: Subject to any disclaimer, the term of this patent is extended or adjusted under 35 U.S.C. 154(b) by 0 days.

(21) Appl. No.: 11/015,859

(22) Filed: Dec. 16, 2004

(65) Prior Publication Data

US 2005/0152049 A1    Jul. 14, 2005

Related U.S. Application Data

(60) Provisional application No. 60/530,050, filed on Dec. 16, 2003.

(51) Int. Cl.
*G02B 1/06* (2006.01)
*G02B 7/02* (2006.01)

(52) U.S. Cl. ............... 359/819; 359/821; 359/822; 359/665; 359/666

(58) Field of Classification Search .............. 359/819, 359/821, 822, 824, 796, 665, 666, 667, 668
See application file for complete search history.

(56) References Cited

U.S. PATENT DOCUMENTS

| 1,735,108 | A |  | 11/1929 | Cox ........................... 359/737 |
|---|---|---|---|---|
| 3,212,420 | A |  | 10/1965 | Cierva ......................... 396/8 |
| 3,337,287 | A |  | 8/1967 | Lessman .................... 352/244 |
| 3,514,192 | A |  | 5/1970 | Cierva ........................ 359/557 |
| 4,961,627 | A | * | 10/1990 | Swain et al. ................ 395/894 |
| 5,424,872 | A |  | 6/1995 | Lecuyer et al. ............. 359/811 |
| 5,568,578 | A | * | 10/1996 | Ames .......................... 385/34 |
| 6,157,405 | A |  | 12/2000 | Momochi ................ 348/208.8 |
| 6,320,705 | B1 |  | 11/2001 | Dube ......................... 359/796 |

* cited by examiner

*Primary Examiner*—Timothy Thompson
(74) *Attorney, Agent, or Firm*—Polster, Lieder Woodruff & Lucchesi, LC

(57) ABSTRACT

An apparatus for steering a light beam having a first lens element, a second lens element, a spacer element and a lubricative optical fluid. The first lens element has a convex lens surface. The second lens element has a concave lens surface. The concave lens surface is placed adjacent the convex lens surface of the first lens element. The spacer element is placed between the convex lens surface and the concave lens surface for maintaining the first and second lens elements at a fixed distance from each other. The spacer element also defines a generally incompressible gap between the first and second lens elements, yet allows the first and second lens elements to move with respect to one another. The lubricative optical fluid is disposed within the gap.

25 Claims, 13 Drawing Sheets

PRECISION OPTICAL WEDGE LIGHT BEAM SCANNER

RELATED APPLICATIONS

The present invention claim priority to U.S. Provisional Patent Application Ser. No. 60/530,050, filed Dec. 16, 2003, the contents of which are expressly incorporated herein by reference.

BACKGROUND OF THE INVENTION

A. Field of the Invention

This invention relates generally to steering light beams by the principle of the refraction of light. More particularly the invention relates to a light beam steering system, which in its simplest form consists of an adjustable optical wedge containing a plano-convex and a plano-concave lens element with nearly matching curvatures on the spherical surfaces. The spherical surfaces of the lens elements being disposed adjacent to one another with a means for maintaining a constant and uniform gap between them during specified modes of operation as a light beam scanner.

B. Description of Related Art

Most commonly, light beams are deflected or steered using mirrors where the principle of reflection is employed. Mirrors are ideal for this purpose when large angles of deflection are required, 45° or more. However, there are many applications that require only small deflections of an optical beam from a few arc seconds to a few degrees. The use of mirrors (as shown in FIG. 1) in these applications is cumbersome at best and often impractical since at least three mirrors are required to effect beam steering in such small angular ranges when the light beam's original optic axis before deflection must be maintained.

Deflected beam angles ranging from essentially 0° to ~30° can readily be obtained by a rotating mirror 2 shown in FIG. 1. However, in order to accomplish this an incoming beam 4 must be diverted from the original direction by mirrors 6 and 8 resulting in the use of three mirrors in order to obtain a small deflection angle ?.

An alternate method for obtaining small angular deflections of a light beam is to refract the beam using an adjustable optical wedge. The principle of refractive beam steering is shown in FIG. 2. An incident laser beam 10 enters an optical wedge 12 at angle $?_1$. The wedge angle of the optic is $\theta_W$. The angle $\delta$ is the deviation angle the transmitted light beam 4 makes with an incident direction 14.

Adjustable optical wedges date back to at least 1929 (H. Cox, U.S. Pat. No. 1,735,108, Nov. 12, 1929), but recent improvements in these devices have renewed interest in them for a variety of beam steering applications. One method for forming an optical wedge, that has been previously disclosed, is to use a liquid filled variable angle prism. Various methods for doing this in one form or another have been disclosed by several individuals and have resulted in U.S. Pat. Nos. 3,212,420, 3,337,287, 3,514,192 and others. The basic idea is to use two flat plates and an optical fluid that is nominally transparent to the incident light beam to form an adjustable optical wedge as shown in FIG. 3.

Referring to FIG. 3, a volume 16, defined by flat glass plates 18, 20 and bellows 22, is typically filled with transparent optical fluid that has a refractive index matching the refractive index of the flat plates 18, 20. The flat plates 18, 20 are adjusted in angle about a hinge 28 in order to obtain a wedge angle ? giving a desired beam deflection d to a transmitted beam 24 with respect to an initial beam 26. It has been pointed out that pressure and temperature effects in the optical fluid in volume 16 can lead to a variation of the index of refraction throughout the fluid volume thereby affecting both beam quality and deviation angle.

Another technique for forming an adjustable optical wedge has been disclosed by Swain et al. in U.S. Pat. No. 4,961,627. The apparatus and method disclosed by Swain is described in part in reference to FIG. 4. Some means must be provided for maintaining a gap between the spherical surfaces; otherwise they will come in contact with each other during the rotation of one surface within the other when forming the desired wedge angle causing damage to the optical surfaces.

Swain disclosed a lens unit 30 with an optical element 32 having a convex semi-spherical surface and another optical element 34 having a concave semi-spherical surface that are disposed with the semi-spherical surfaces in close proximity to each other. They remain separated by a gap 36 that is maintained by ball bearings 38. The gap 36 may be filled with an optical fluid. These ball bearings perform the necessary function of keeping a constant gap spacing at all times. Of course, means (not shown here) for supporting the optical elements and for adjusting a wedge angle d between optical elements 32 and 34, must also be provided. An incident light beam 40 is transmitted through the lens unit 30 and is deviated at a desired angle ? with respect to the optic axis 42.

There are some issues that arise when employing Swain's method for forming an optical wedge. First, it would appear that this technique might only be practical, due to cost, in steering applications that are more or less unique one-of-a-kind applications. It is believed that the perceived cost of this device may preclude its general wide spread acceptance in most laboratories. Second, it is noted that the bearings are disposed to move along the surface of the optical elements posing a risk of damage to the surface of these elements.

Third, it is noted that the ball bearings move along the spherical surfaces as one of the lens elements is rotated. Therefore, unless the curvatures are properly matched, a change in the gap uniformity will be induced, as the center of curvatures of the two semi-spherical surfaces shift with respect to each other during operation. If this is prevented from happening then the bearings will slide rather than roll along the surfaces. If an index matching fluid is used in the gap then this effect presents no difficulty. However, in some applications index matching fluid is not available and in these instances refractive errors which cannot readily be corrected if proper alignment is not maintained between the stationary and movable lens elements may be imparted to the transmitted beam.

The use of bearings to maintain alignment between the movable and stationary lens elements requires that the bearings alone provide this alignment. The method of actuation disclosed by Swain could lead to a conflict between the bearings and the actuators regarding this alignment.

On the other hand, if neither bearings nor gimbals are used to maintain gap spacing then the mechanical means of support and alignment become even more complex with added attendant cost. There have been innovations involving rather complex mechanical systems that do not utilize gimbals to provide for motion of one lens with respect to the other which claim rotation along the spherical surfaces in a stable and uniform manner, e.g. Lecuyer and Quinn who disclose a Retrofit Line of Sight Stabilization Apparatus and Method, U.S. Pat. No. 5,424,872; and Momochi who discloses an Apex-angle Variable Prism and Video Camera, U.S. Pat. No. 6,157,405. However, this problem has been solved by another method for providing a uniform gap spacing that requires neither gimbals nor complex and expensive mechanical systems.

This method for forming an adjustable optical wedge has been disclosed by Dube' in U.S. Pat. No. 6,320,705, the contents of which are hereby incorporated by reference, and is shown in partial cross-section in FIG. 5. This apparatus is called a "Lubricated Adjustable Optical Wedge" (LAOW), (also known as a "matched-lens" beam steerer). The optical wedge in this case consists of a lens unit 44 containing a plano-concave lens element 46 and a plano-convex lens element 48. Spherical surfaces 50 and 52 of these two lens elements 46, 48 are disposed in lubricated contact with each other with a gap 54 remaining between them. The spherical surfaces 50, 52 have radii of curvature that are nominally the same. The gap 54 between the lens elements is filled with an optical fluid or lubricant, which wets both spherical surfaces 50, 52 leaving essentially no voids or air pockets within the gap 54. The term "optical fluid" for purposes of this disclosure is taken to mean a fluid that is nominally transparent to an incident light beam and that has lubricating properties.

One of the lens elements (in this case lens element 46) will be fixed securely to a base of support (not shown) and is regarded as a stationary element. The other lens element 48 will be operated or subject to movement by applying an external force to displace or rotate it about the center of curvature causing the formation of a wedge angle ?. A light beam 56 enters the lens element 48 through a surface 58 and is transmitted through the lens unit 44 and exits a surface 60 as shown making an angle d with an optic axis 62. The forces of capillary action and surface tension acting within the gap 54 can be the sole means for holding the lens elements 46, 48 together. The optical fluid within the gap 54 also keeps the spherical surfaces 50, 52 from contacting each other, thereby preventing damage to these polished optical surfaces during operation. The rotated element 48 will maintain its spherical surface 52 in intimate contact with the lubricant interface during this movement. The forces of capillary action and surface tension are sufficient in some modes of operation to maintain a fixed and uniform gap between the two lens elements 46, 48 and at the same time hold the lens elements 46, 48 together without any other means of support, thus avoiding the use of expensive mechanical mounts or gimbaled systems.

A most important area where this innovation functions well is in applications where adjustments of the wedge angle are infrequent and normally accomplished by manually operated actuator/driver systems. Devices using the LAOW concept have been manufactured and are currently on the market.

The LAOW adjustable optical wedge greatly simplifies the mechanisms needed to actually displace or rotate one of the lens elements 46, 48 within the spherical cavity of the other in order to create a wedge angle. This was aided by another innovation disclosed in the Dube' Patent, i.e. a lens ring with a spherical surface was used into which the movable lens is mounted. The outer surface of this ring has a spherical contour that provides a simple means for smooth, precise, and repeatable positioning of the movable lens.

Exacting measurements of the performance of a high precision LAOW device have resulted in a repeatability of ±0.1 arc seconds in the angle of deflection. These measurements were actually limited by the resolution of the instruments used to conduct these tests. Contrary to the innovations disclosed by Swain et. al., Lecuyer and Quinn, and Momochi, the method taught by Dube' may be used in a practical sense with small lens diameters as well as large lenses, which may range from a few millimeters up to hundreds of millimeters without any change in the driving mechanisms or addition of mechanical support mechanisms except for scaling the size appropriately.

The LAOW concept has been studied extensively and undergone refinements in the methods of actuation that have led to much smaller and simpler devices. One area that remained to be investigated was the operational characteristics of a LAOW device in a continuous scanning mode. A study of the concept under a continuous duty scan mode was conducted under a contract with the Eglin Air Force Research Laboratory. In this study lens units ranging from 2" to 4" in diameter and cycle rates up to ~9 radians/second were used in the tests.

During the course of the Air Force studies it was found that 1) the lens units would indeed stay together up to the maximum cycle rate of 9 Hz (no lens units separated during these tests), 2) settling occurred when the lens unit was left in a stationary mode for periods of time ranging for a couple hours to several days, and 3) the uniformity of the lubricated gap would change over a period of time while scanning. The settling resulted in the gap narrowing and, in some cases, glass to glass contact was made, which led to scratches in the lenses upon resumption of scanning. Changes in the uniformity of the lubricated gap directly affects the optical wedge angle and the pointing direction of the transmitted light beam. A device that had been calibrated for high precision beam steering could thus lose its calibration if the uniformity of the lubricated gap were to change during the course of operation.

Although these phenomena had not been observed prior to the Eglin test program, it was not unreasonable to suspect such behavior. Therefore, another innovative technique for forming the optical wedge was included in the original proposal to Eglin that was tested and in fact was reduced to practice during the course of the Eglin contract. This innovation is, in effect, a method for forming an adjustable optical wedge that maintains a uniform gap between two lens elements both while in storage and during operation in a continuous scanning mode. As with the Dube' Patent, this new innovation requires neither complicated mechanical support structure to maintain alignment between lens elements nor gimbals.

It is important to maintain a constant spacing in the gap and uniformity in the gap volume in order for the beam steering unit to impart precise and repeatable angular deflections to the transmitted beam. The method taught by Swain utilizes ball bearings to provide this essential feature. The method taught by Lecuyer and that taught by Momochi use complicated mechanical support means. The method taught by Dube' relies solely on the forces of surface tension and capillary action to provide this characteristic. All of these innovations utilize lens elements comprising the optical wedge that are of a similar nature. The distinguishing feature amongst them is the technique employed to maintain constant and uniform gap spacing during the formation of the wedge angle.

The Dube' approach was seen to work well under certain conditions as discussed earlier. However, the perceived areas of applicability for refractive beam steering may subject the lens unit to long storage periods, continuous scanning at high rates for long periods, and deployment in platforms subject to vibrations and environmental contaminants. Under these conditions the Dube' innovation cannot be relied upon to maintain a uniform and constant gap spacing. The present innovation does not rely on the techniques described in these prior arts to provide this important characteristic.

DETAILED DESCRIPTION OF THE PREFERRED EMBODIMENT

Figure 1:
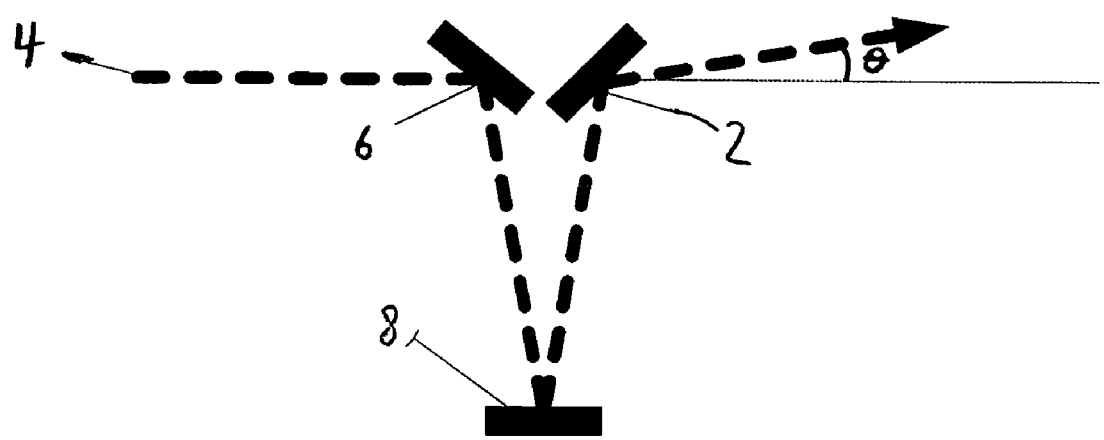
FIG. 1 is an example of small angle beam deflection according to the prior art.
Figure 2:
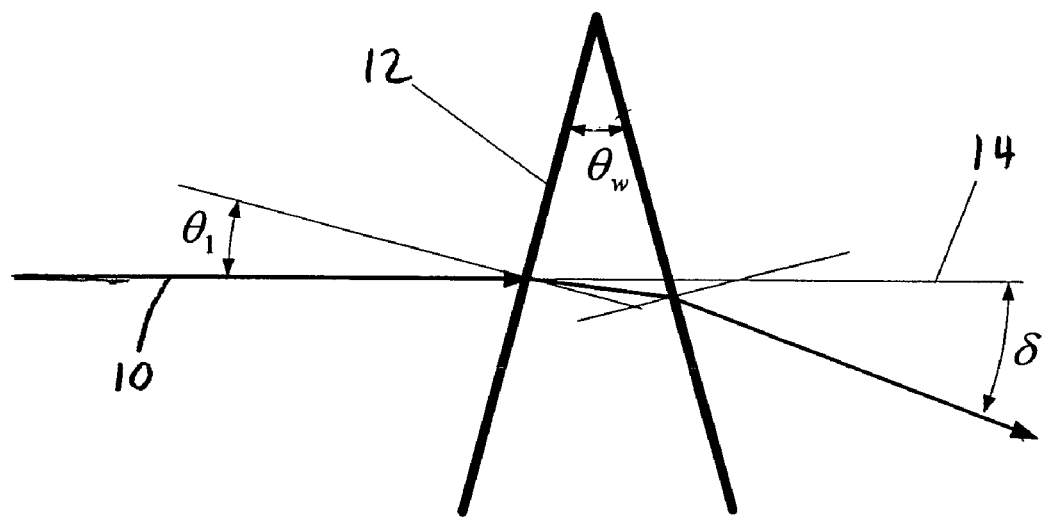
FIG. 2 is an example of refractive beam steering as known in the prior art.
Figure 3:
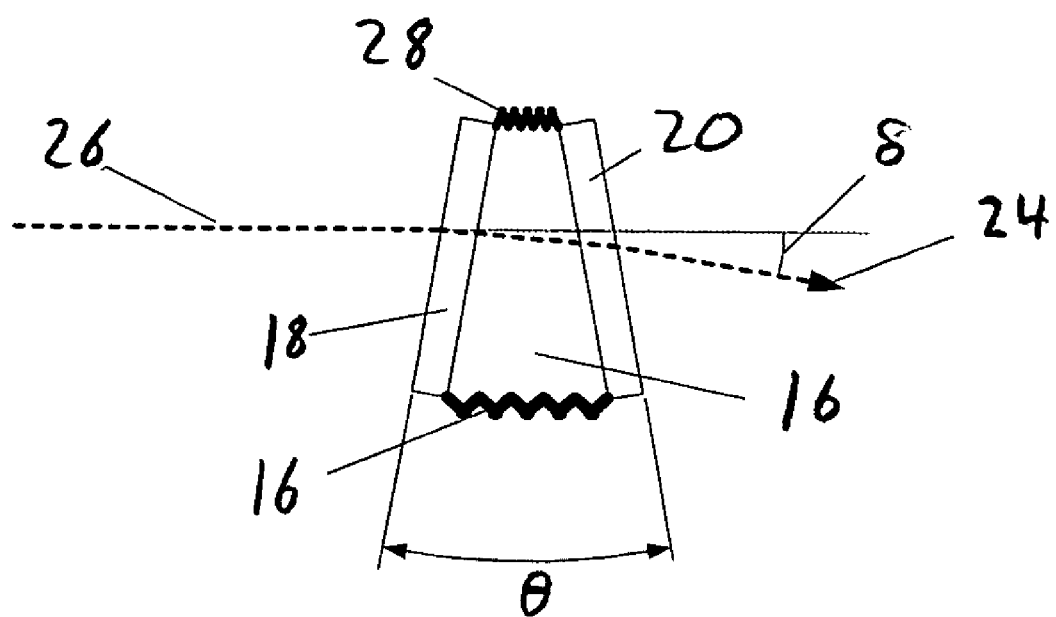
FIG. 3 is an example of a liquid filled adjustable wedge according to the prior art.
Figure 4:
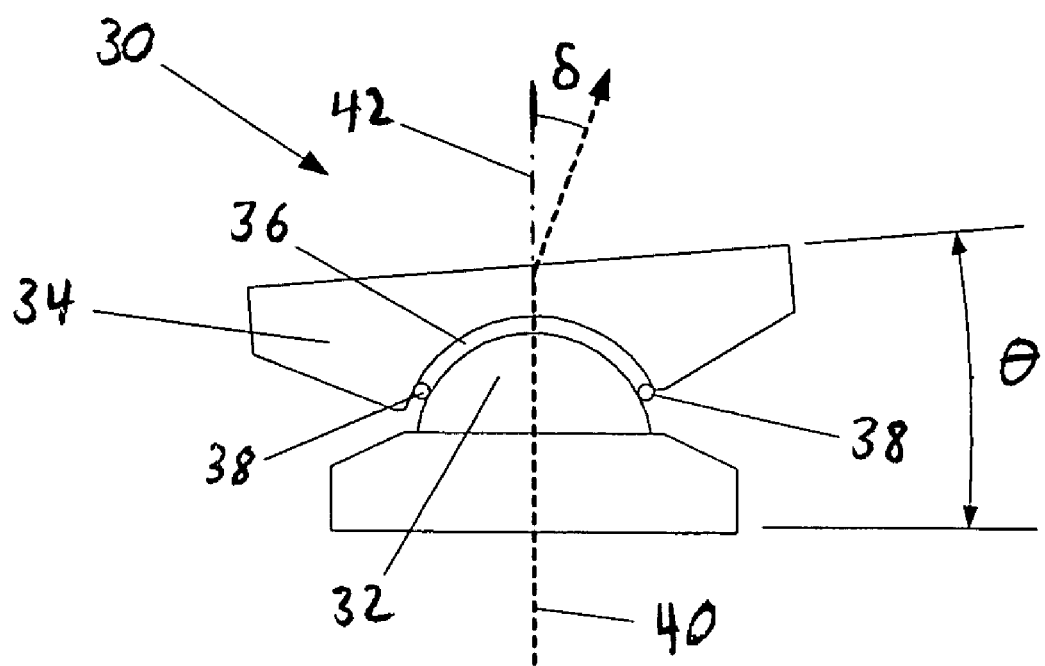
FIG. 4 is an adjustable optical wedge with a gap spacing maintained by ball bearings according to the prior art.
Figure 5:
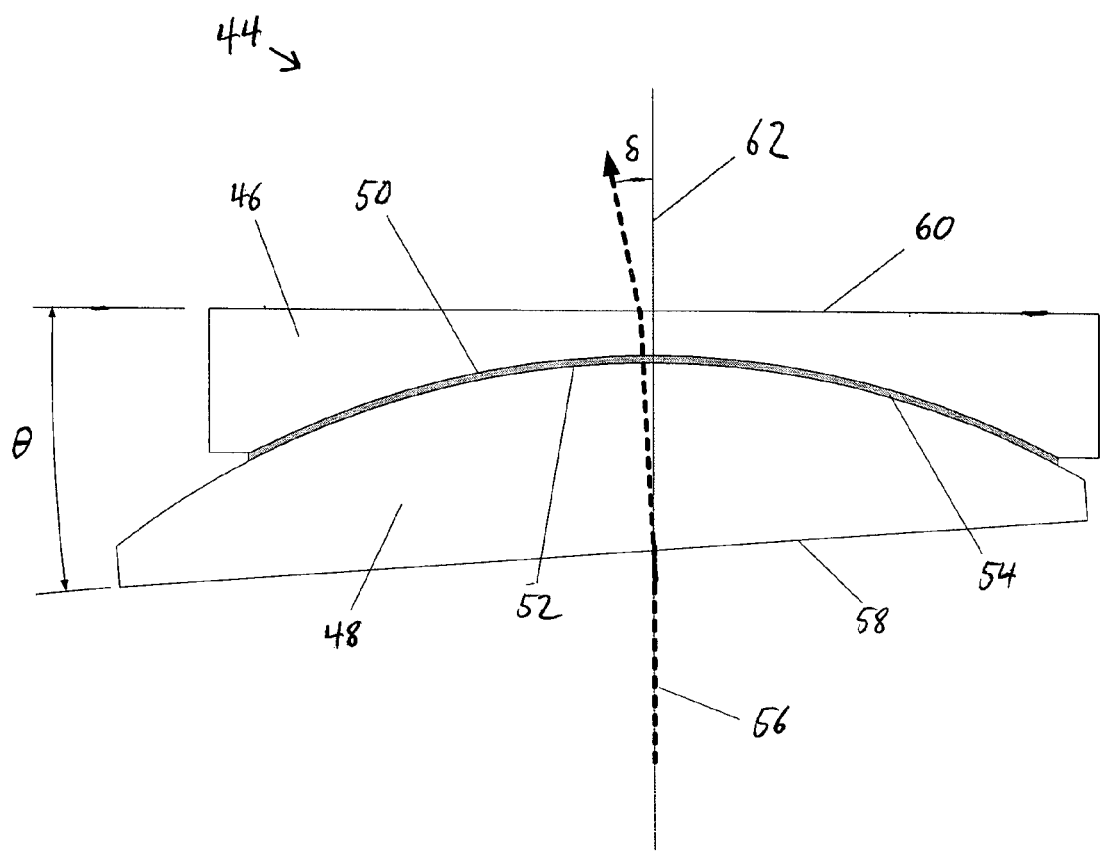
FIG. 5 is a lubricated adjustable optical wedge lens unit according to the prior art.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

This invention in its simplest form uses two optical lens elements commonly known as plano-convex and plano-concave lenses to form the optical wedge. Several of the prior art devices utilize these same two basic elements. In fact it can be said with some reasonable degree of assurance that these prior art devices, except the Dube' innovation, are in a practical sense limited to the use of only two such elements, only one of which is movable, due to the high cost of the attendant mechanical positioning and aligning mechanisms that would be incurred if more than two lens elements were used. The current invention is not so limited as will be shown below.

Figure 6:
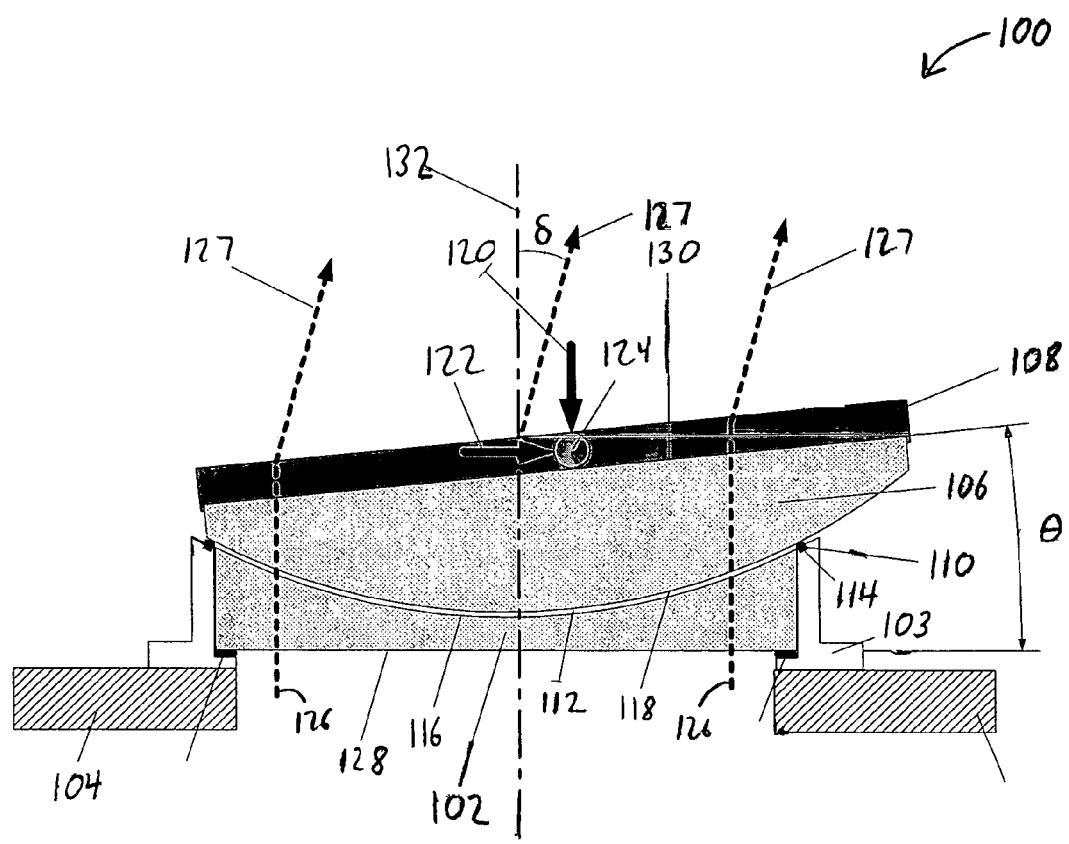
FIG. 6 is a partial section view of a precision optical light beam scanner according to an embodiment of the present invention.

The apparatus and method of the present innovation for steering a light beam will be described in detail in reference to FIG. 6. The apparatus in FIG. 6, shown in partial cross-section, will be referred to as a lens unit and is generally represented as element 100. The lens unit 100 uses the simplest combination of optical elements that can be assembled to effect the steering of a light beam using this concept and is the preferred embodiment of the invention.

The lens unit 100 comprises a plano-concave spherical lens 102 and a mounting lens ring 103 bonded together, which in this construction is regarded as a stationary lens. The lens ring 102 would typically be mounted to a plate 104 that provides support for the entire unit 100. The lens ring 102 and the support plate 104 may be combined into a single element.

A plano-convex lens element 106 is mounted in a lens ring 108 and is the movable element of the lens unit 100. The lens elements 102, 106 are separated by a spacer element, which in the preferred embodiment is an O-ring 110, and a narrow gap 112 that is filled with optical fluid. The O-ring 110 is seated in groove 114 in the lens ring 103. The O-ring 110 captivates and seals the optical fluid within the gap 112, thus forming a virtually incompressible volume that allows the movable lens element 106 to move smoothly and easily on the lubricant and O-ring 110. The volume 112 that is bounded by a concave spherical surface 116 of the lens 102, a convex spherical surface 118 of the lens 106, and the O-ring 110 defines the gap 112. The optical fluid will be introduced into the gap 112 so as to completely fill the captivated volume 112 with minimal voids or air gaps remaining. It is clear that the roles of the lens elements 102, 106 could be reversed and the resulting construction would function equally well for its designed purpose.

The lens unit 100 shown in FIG. 6 shows the convex lens 106 as having a larger diameter than the concave lens element 102. One of the lens elements 102, 106 must be larger in diameter than the other in order for the gap volume 112 to remain captivated and sealed by the O-ring 110 as the movable lens element (in this case, lens element 106) is displaced or rotated to form an optical wedge angle ?.

There are, of course, forces of both capillary action and surface tension within the gap 112 acting to hold the lens elements 102, 106 together. However, these forces are neither relied upon nor required to maintain an integral lens unit that has a uniform gap of a fixed spacing. Instead a resultant compressive force 120 is applied at symmetric points around the periphery of the movable lens ring 106 for this purpose. The compressive force 120 may be generated by various means, for example tension springs attached to lens ring 108 and the base plate 104. Alternatively, a compression spring could be placed in contact with the lens ring 108 and a top stationary plate (not shown) above lens ring 108.

The lens element 106 is displaced by applying a resultant force 122 to the attached lens ring 108 at a point 124 in order to form the optical wedge angle ?. Typically, there will be four points at 90° intervals around the periphery of the lens ring 108 where a force 122 may be applied in order to obtain motion of the lens element 106 about two orthogonal axes, thus providing beam steering in two orthogonal dimensions (or what is sometimes referred to as two-axis beam steering).

The driving force 122 may be generated by a wide variety of means known to those skilled in the art. Examples of such actuator/drivers include piezo-electric devices, micrometer actuators, linear stepper motors, and voice coil actuators. The point of application 124 of the driving force 122 may be arranged to suit the needs of the application. For example, by attaching a bracket on lens ring 108 at point 124, the driving force 122 could be applied at a point higher or lower than point 124 on lens ring 108.

Beams of light 126 are shown as entering the plano surface 128 of lens element 102 (in this case normal to the surface 128, although that is certainly not a requirement). In the ideal case, the refractive index of the optical fluid in gap 112 will be the same as the refractive index of the lens elements 102, 106. In this case, the light will transmit through the lens unit without refraction or reflection at the surfaces 116, 118 and exit out the plano surface 130, where it will be deviated by a certain angle d measured with respect to the optic axis 132 due to refraction (the off-axis light beam 127). The deviated angle d can be readily determined by the application of Snell's Law at each of the plano surfaces 128, 130, and use of the wedge angle ? of the lens unit 100, and the index of refraction of lens elements 102, 106. A general formula for determining the deviated angle d in this case is:

$$\delta = \theta_1 - \theta_W + \arcsin\{(n^2 - \sin^2\theta_1)^{1/2}\sin\theta_W - \cos\theta_W \sin\theta_1\}$$

where $?_1$ is the incident angle of the laser beam, $?_W$ is the wedge angle of the optic and n is the refractive index of the lens elements 102, 106.

The O-ring 110 is located in the groove 114 in the lens support ring 103 holding the concave lens 102 as shown in FIG. 6. The O-ring 110 is fixed in position and does not move as the convex lens element 102 is rocked back and forth to form the optical wedge. This means that, contrary to the method of Swain, the lens radii of curvature do not have to be exactly matched to maintain gap uniformity, in fact they could differ significantly if there were a compelling reason to do so.

When the lens radii of curvature are different, uniform gap spacing can no longer be obtained. In this instance what is important is that the gap remains symmetric about the optical axis. This is illustrated in reference to FIGS. 7A, 7B, 7C and 7D. The gap spacings shown in these Figures are greatly exaggerated for clarity.

Figure 7:
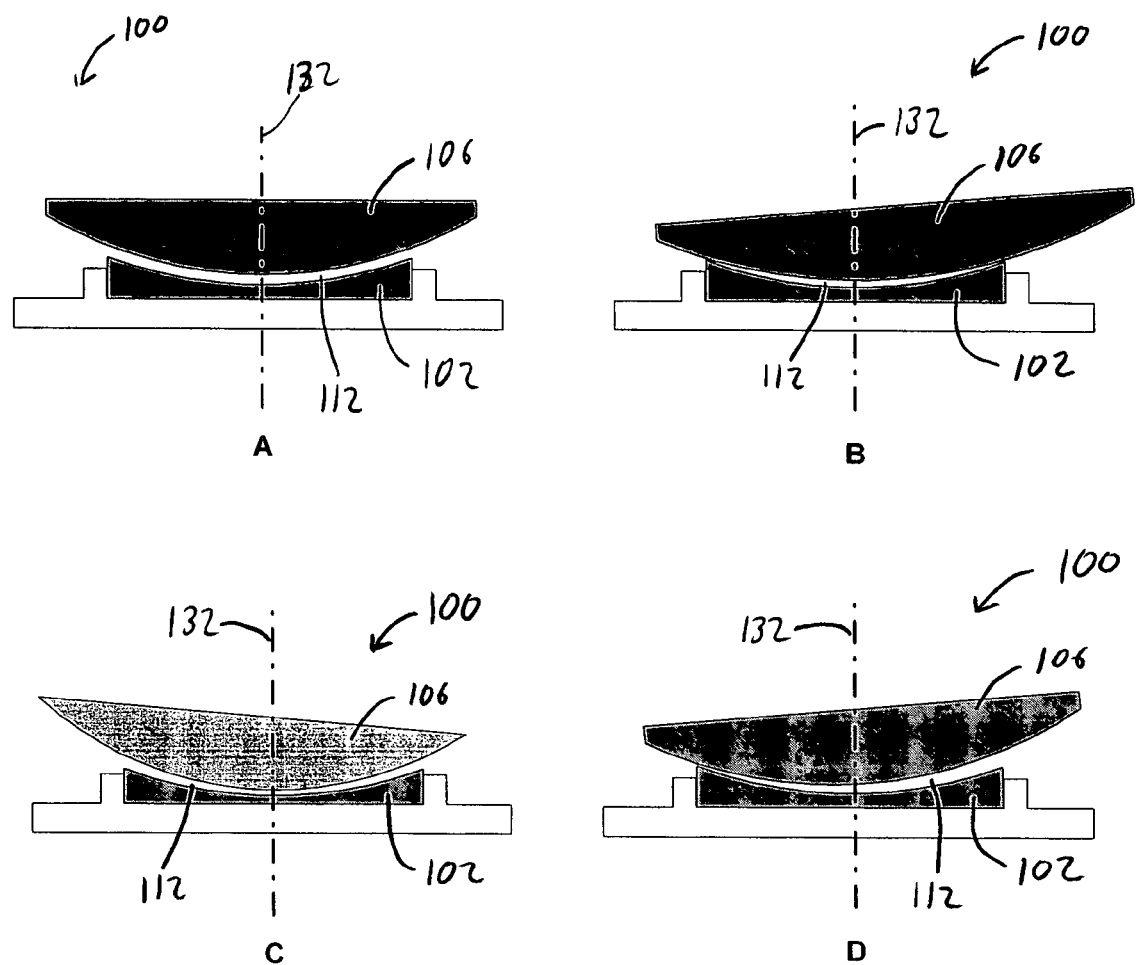
FIGS. 7A–7D are views showing lens units according to the present invention in various states of gap uniformity.

A lens unit 100 with a uniform gap is shown in FIG. 7A. The lens elements 102, 106 have very nearly the same radius of curvature. As the convex lens element 106 is rotated about its center of curvature, the gap 112 will remain uniform if the center of curvature remains on the optic axis 132 of the concave lens element. Furthermore the gap spacing 112 will remain constant if the center of curvature remains at a fixed point on said optic axis 132.

Lens units 102, 106 where the radii of curvature are different are shown in FIGS. 7B and 7C. The convex lens 106 has a larger radius of curvature than the concave lens 102 in FIG. 7B. In this case it is observed that the gap spacing 7 is no longer uniform. The gap spacing 112 is defined as the distance between the two lens elements 102, 106 as measured along the optic axis 132 of the stationary lens 102. Hence, the gap spacing 112 will remain constant as long as the convex lens 106 rotates about its center of curvature, which remains at a fixed point along the optic axis 132 of the concave lens 102. In this case the gap spacing 112 will remain symmetric about the optic axis 132 and at a constant spacing. The convex lens 102 has the smaller radius of curvature in FIG. 7C.

An objective of the present invention is to insure that in all three cases shown in FIGS. 7A, 7B, and 7C, the gap spacing 112 remains essentially constant and symmetric about the optic axis 132 of the concave (stationary) lens element 102 at all times. It is intended to prevent the gap 112 from changing its state of symmetry (or uniformity) and spacing over time as the lens unit 100 is operated. A lens unit where the gap changes its state of symmetry or spacing will lead to imprecise and non-repeatable angles of deviation in the transmitted light beam and/or damage to the polished optical surfaces if they come in contact with each other. A case where the gap is neither uniform nor symmetric is shown in FIG. 7D.

One of the attractive features of the present invention is that the gap spacing can readily be preset to a desired value without invoking a complicated and tedious alignment process. Once the gap is preset (using the procedure described below), uniformity or symmetry of the gap is assured since the lens elements remain basically self-aligned with respect to each other. The most stable gaps are obtained at small gap spacing and are suitable in applications that need the maximum precision in pointing angle. However, it is well known that the shear forces in the lubricated gap are inversely proportional to the gap spacing. At very thin gaps, a few microns for example, the forces needed to displace the movable lens unit can become significant, especially if the movable lens unit is oscillated at a high cycle rate. In these applications it may be desirable to set a larger gap in order to minimize the driving forces needed to operate the scanner.

The combination of the lubrication and the O-ring 110 forms a nearly incompressible gap 112 in the sense that the volume of liquid captivated between the lens spherical surfaces 116, 118 and the O-ring 110 will remain constant. The gap 112, which is to be preset, can be set to a very small spacing, certainly as small as 0.0001" up to several thousandths of an inch if desired. The most stable gap 112, one that will have the greatest resistance to becoming nonuniform, will be preset with a small spacing, for example less than 0.001".

It is clear that the natural elasticity or springiness of the O-ring 110 tends to work against non-uniformities in gap spacing 112. Thus, if one side is temporarily compressed due to an unbalanced force, it will spring back once the force is released. Furthermore, it is well known that an O-ring 110 in a tight O-ring groove 114 even without the lubricant present is highly resistant to compressing. Quite large forces are required in order to compress such a captivated O-ring 110 more than 0.002" to 0.003" and such forces would not normally be present in the operation of most scanner systems. This factor along with the constant lubricated gap volume insures a uniform and/or symmetric, stable gap 112 and enables precise alignment between the two lens elements 102, 106 comprising the lens unit 100.

The surfaces 128, 130 of the lens elements 102, 106, respectively in FIG. 6, need not be plano or flat as indicated in this embodiment. They could be curved (in general either spherical or aspherical) and, therefore, used to provide corrections or changes to the wavefront of the transmitted beam 126 should there be an application where this would be required or advantageous.

The indices of refraction of the optical fluid and the lens elements 102, 106 in FIG. 6 can often be made approximately equal in value. This is the most desirable configuration since the beam of light will not encounter any change of index as it traverses the optical fluid/lens interfaces and, hence, will not be subject to loss of intensity due to reflections. The spherical surfaces 116, 118 comprising the lubricated gap 112 boundaries will not require additional coatings in this case, which would otherwise be needed to minimize reflective losses to the transmitted beam. Furthermore, the external surfaces 128, 130 of the optical elements 102, 106 can be coated with an anti-reflective coating to essentially eliminate beam intensity losses due to reflections.

Some applications may require the use of lens elements 102, 106 with a high index of refraction, like germanium with an index of ~4.0 or silicon with an index of ~3.5. There currently are no transparent lubricants that can match the high indices of these materials. Therefore, an index mismatch occurs between the lens elements 102, 106 and the optical fluid resulting in reflective losses in the transmitted light beam 126. The spherical surfaces 116, 118 of lens elements 102, 106, respectively in FIG. 6, may be coated with an anti-reflective thin film when such an index mismatch occurs. This would reduce the reflective loss of the light beam as it traverses the lens surface 116/lubricated gap 112 interface and the lubricated gap 112/lens surface 118 interface.

There are three potential problems when anti-reflective coatings are required at the lens/lubricate gap interface due to an index mismatch between lens material and optical fluid. First, this will lead to refractive errors in the off-axis light rays 127. This has the effect of adding a slight amount of aberration to the transmitted beam, which may be undesirable. This effect can be reduced substantially by carefully specifying the radii of curvature of the spherical surfaces 116, 118 of the lens elements 102, 106 in FIG. 6 that form the gap 112. The curvatures needed for correction will be dependent on the respective indices, curvatures, and gap spacing 112, but in any case the resulting corrected curvatures will be different for the two lens elements 102, 106.

In order to illustrate the nature of this effect a silicon lens unit 100 consisting of plano-concave and plano-convex lens elements 102, 106 with a refractive index of 3.48, are in lubricated contact with a highly transparent optical fluid with an index of 1.632. The lens elements 102, 106 have identical radii of curvature of 133 mm and are separated by a lubricated gap 112 of 12.5 µm (~0.0005 inches). A beam of light with a wavelength of 1.55 nm enters the lens unit 100 normal to the plano surface 128 of the plano-concave lens element 102. If the wedge angle ? of the lens unit 100 is zero then the transmitted beam should exit the lens unit 100 without deviation over the entire clear aperture, which in this case is circular with a diameter of 124 mm. However, there is a mismatch in this case between the indices of refraction of the optical fluid and the lens material. A calculation using a ray trace program shows that the average deviation of the light rays exiting the lens unit is not zero, but 0.148 milliradians.

These so-called refractive errors can be reduced in this case by an order of magnitude for an average deviation of 0.0147 milliradians by increasing the radius of curvature of the spherical surface 118 of the plano-convex lens 106 by 0.009 mm, i.e. from 133 mm to 133.009 mm. Of course, it would be evident to those skilled in the art that a correction could also be applied by changing one or both of the plano surfaces 128, 230 to curved surfaces with very slight curvature or a combination of adjustments to the plano and spherical surfaces 128, 130 and 116, 118. The exact curvatures necessary for the correction would again be determined by mathematical analyses. The foregoing calculation is not intended to be the optimum correction, but is used to demonstrate the potential for improving the optical quality of the transmitted beam by a relatively simple and practical means when a mismatch in the indices of refraction is present. This also points out that careful attention must be given to the design of the lens unit when index mismatches are present and the highest transmitted beam quality must be maintained.

Second, as the movable lens element 106 is rocked back and forth to create the wedge angle ?, its spherical surface will slide on the lubricated O-ring 110. In general, the anti-reflective coatings are less resistant to abrasion than the underlying lens surface 118. It has been found that for several common elastomeric O-ring materials such as Viton, Buna-N, and silicon, no damage is imparted to either the uncoated or coated lubricated spherical surfaces 118 during the scanning motion. Teflon O-ring material has been found to work best with uncoated lubricated spherical surfaces 118.

Third, the index of the optical fluid will in general be smaller than the index of lens materials such as germanium or silicon. Therefore, depending on the radii of curvature of the spherical surfaces 116, 118 forming the gap 112 and the amount of index mismatch present, total internal reflection (TIR) of the light rays 126 in FIG. 6 can occur at the spherical surface 116/lubricated gap 112 interface. The radius at which TIR begins to occur is called the TIR limiting radius and is easily calculated. Transmission at the limiting radius and beyond will be totally attenuated. This effect limits the clear aperture available with the beam steering unit or alternatively limits the steering range capability of the device. When this situation is present, the optical designer may have to choose between total angular steering range and clear aperture.

Figure 8:
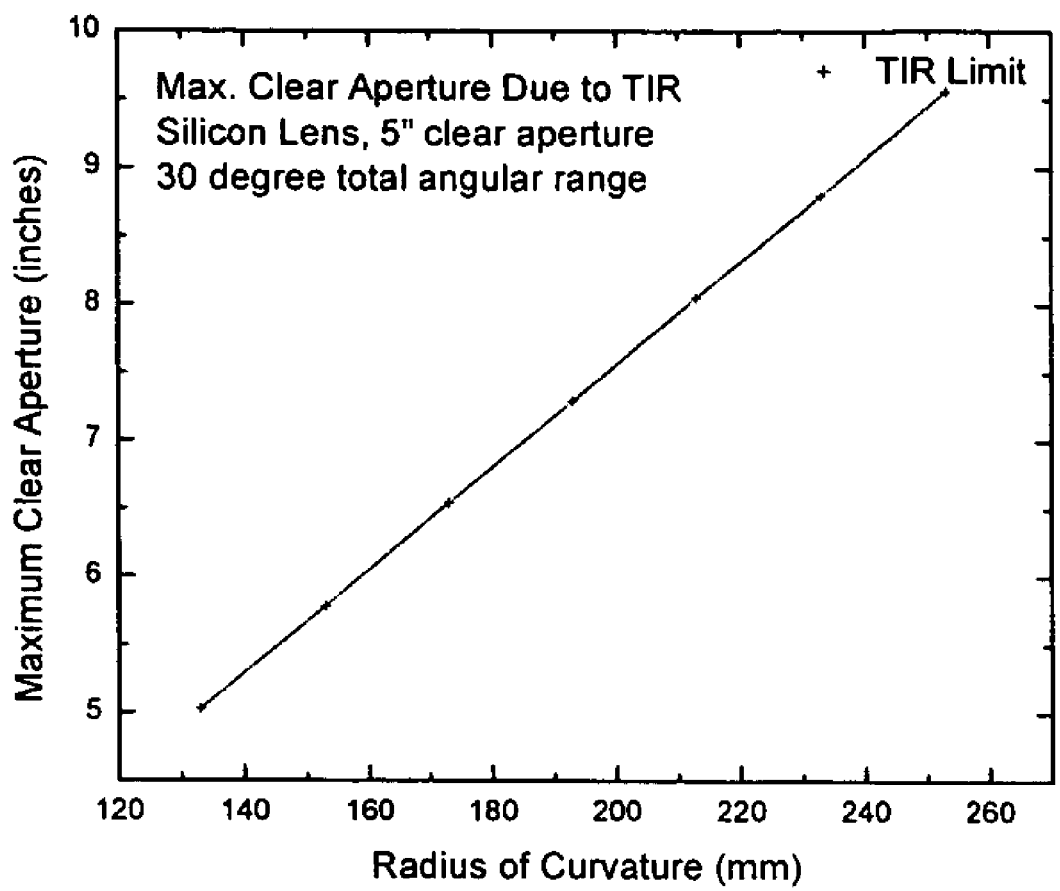
FIG. 8 is a graph of maximum clear aperture of a lens unit versus radius of curvature.

The TIR limiting aperture effect is illustrated in FIG. 8. The maximum diameter of the transmitted beam (called the maximum clear aperture in FIG. 8) is shown as a function of the radius of curvature of the lens unit 100 (both lens elements 102, 106 are assumed to have the same radius of curvature in this example). A silicon lens unit with an index of refraction of 3.48 has been used in these data with an optical fluid having an index of refraction of ~1.67. It is clear in these data that the TIR limiting clear aperture decreases as the radius of curvature decreases.

In this present innovation (in reference to FIG. 6) the gap 112 volume and the O-ring 110 constitute the sole means for maintaining the alignment of the movable lens element 106 with respect to the stationary lens element 102. This innovation allows the gap 112 to be either very narrow, which increases the stability of the beam steerer, or wider to reduce the driving forces 122 necessary to operate the scanner. The compressive force 120 insures that the lens elements 102, 106 remain together for stable and precise light beam steering.

Figure 9:
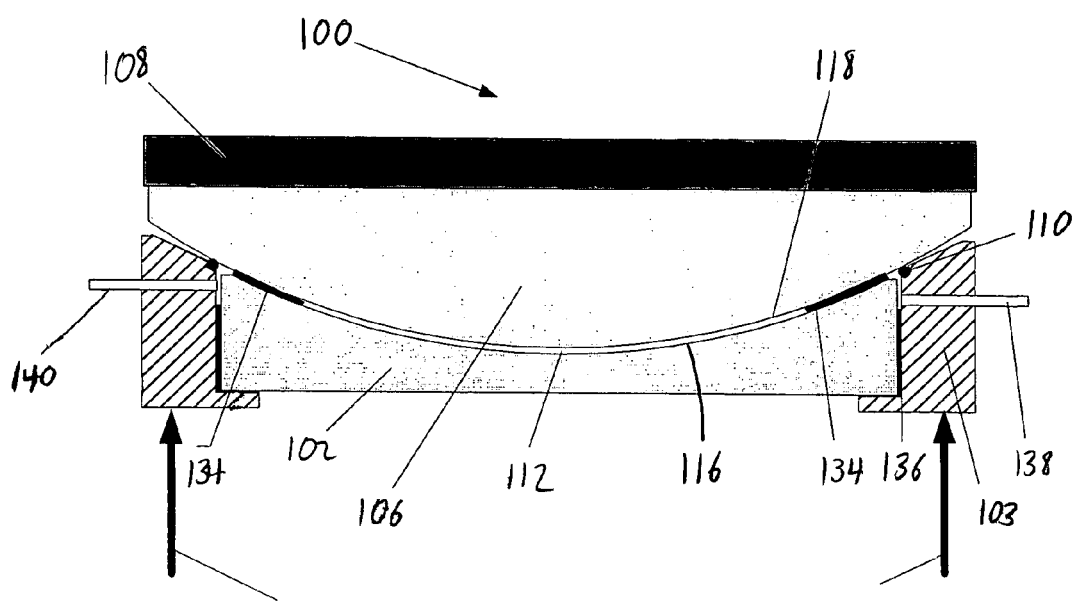
FIG. 9 is a partial section view of a lens according to an embodiment of the present invention.

A method for setting the gap 112 is described with reference to FIG. 9. The lens elements 102, 106 are set together without lubricant and rest at three points on shims 134 of the desired thickness. The concave lens ring 103 with O-ring 110 in place is then placed into position and compressed a slight amount as it comes into contact with spherical surface 118 under the application of compressive force 120. Since the optical surfaces are highly polished and spherical, only a slight compression of the O-ring 110, enough to induce a deformation of 0.002" to 0.003", is all that should be required to give a good seal. While under compression, the lens ring 103 is bonded at the location 136, which extends around the periphery of the concave lens element 102, using a low-shrinkage bonding agent.

The lens unit 100 must next be reassembled with the lubricant in place. This is accomplished by placing a pool of lubricant in the cavity of the concave lens 102 and setting the lens elements 102, 106 together. The shims 134 are used to set the proper gap and a fill line 138 and a vent line 140 are used to insure that no air remains in the enclosed volume. After the gap 112 is set the shims are removed leaving at most a small fraction of a cubic millimeter of void area. This can be removed by operating the unit 100 while maintaining a supply of lubricant through the fill and vent lines 138, 140.

Alternately the shims 134 do not have to be used when assembling the lens unit 100 with optical fluid. One could apply the same force 120 on the unit when lubricating that was applied when bonding the concave lens ring 108 to the lens element 102 with the shims 134 in place. This would be done with the vent line 140 open to allow excess lubricant to escape.

After the process of filling the gap with optical fluid is complete, the fill line 138 and the vent line 140 may be sealed off to prevent loss of lubricant. Alternatively, one of the fill and vent lines 138, 140 them may be sealed off and the other connected to a closed container of optical fluid that is maintained at a fixed pressure. This would allow a constant gap volume to be maintained during expansion and contraction of the fluid in the gap and at the same time provide a supply of lubricant should a small amount of optical fluid seep out or otherwise be lost over a long period of time.

Figure 10:
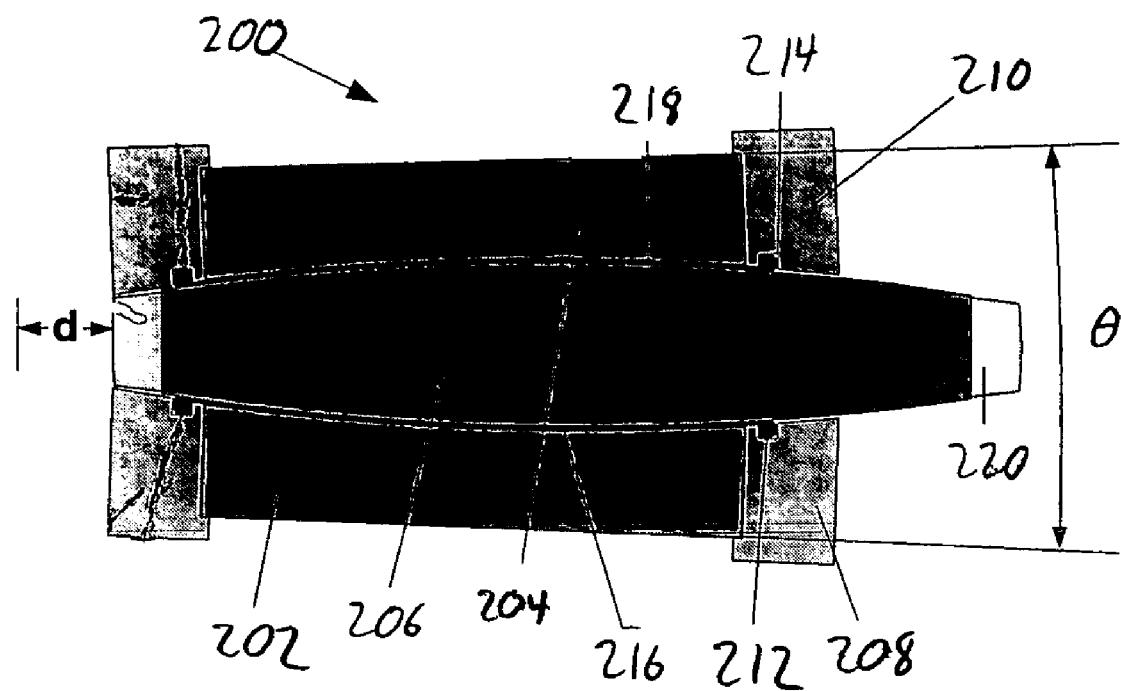
FIG. 10 is a section view of a precision optical light beam scanner according to an embodiment of the present invention having three lens elements.

It will be apparent to those skilled in the art that this concept could equally well be applied to a lens unit comprising more than two lens elements. An example of a three element optical wedge is shown in FIG. 10. The lens unit 200 consists of three lens elements, two plano-concave lens elements 202, 204 and a biconvex lens element 206. The lens elements 202, 204 are contained within lens rings 208, 210 respectively, each with an O-ring 212, 214 to space gaps 216, 218. The biconvex lens element 206 is mounted in lens ring 220. The gaps 216, 218 are then filled with optical fluid in a similar manner to that just described. The three-element lens unit 200 will have essentially the same properties of stability and uniformity attributed previously to the element lens unit 100 shown in FIG. 6. An attractive feature of this three element configuration is that the wedge angle ? obtained by translating either the biconvex lens 206 or the two concave lenses 202, 204 a given distance "d", will be twice that obtained in a comparable two element lens unit. It will be obvious to those skilled in the art that the roles of the lens elements 202, 204 and the lens element 206 could again be reversed in the lens unit 200.

Figure 11:
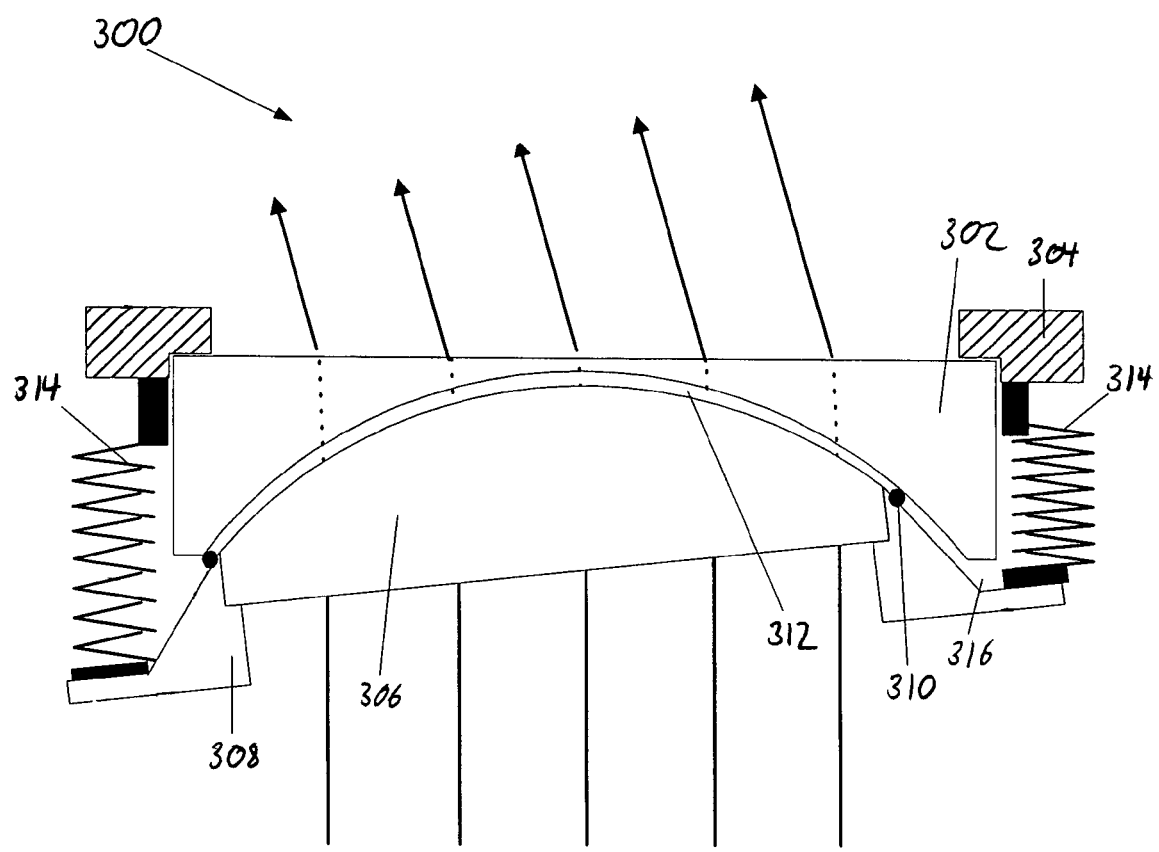
FIG. 11 is a partial sectional view of a precision optical light beam scanner according to an embodiment of the present invention incorporating bellows members.

The O-ring stabilized gap 112 may be used, as shown in FIG. 6, where the optical fluid is present in the captivated volume only. But, it may also be used in a lens unit that has optical fluid both in the captivated volume and outside this volume by using a flexible coupling, such as a bellows, to seal a secondary volume of optical fluid surrounding the O-ring as shown in FIG. 11. Referring to FIG. 11, the lens unit 300 consists of a plano-concave lens 302 contained by a stationary lens ring 304 and a plano-convex lens 306 contained in a movable lens ring 308 with a spacer O-ring 310. A gap 312 is set by the spacer O-ring 310 and optical fluid contained within the captivated gap volume 312. A flexible coupling, such as bellows 314, or other seal is attached to lens ring 304 and lens ring 308 to seal the gap 312 from the environment. In this case, interior volume 316 of the bellows can also be filled with optical fluid. This embodiment has the advantage of preventing the lubricant from drying over long periods of time and maintaining fluid contact over the entire surface area of the O-ring 310.

The lubricant volume is completely sealed from the surrounding environment in this design, thus preventing contamination of the optical fluid. The bellows seal 314 could equally well be used in conjunction with the embodiment of the innovation shown in FIG. 6. Although it is possible that the tensile spring force of the bellows could be used as the force compressing the lens elements together, it is considered preferable to make the bellows tensile force as small as possible thus minimizing any tendency for this force to contribute significant unbalanced compressive forces on the lens unit 300 during operation.

The movable lens element in this innovation, as for example lens element 106 that is attached to lens ring 108 in FIG. 6, must be displaced or rocked (the rocking motion is also referred to as rotation about the center of curvature) in order to form the optical wedge angle ?. Since the lens unit 100 in this innovation and in particular the alignment between the two lens elements 102, 106 is so robust, the driving force 122 may be applied in a number of ways without concern for disturbing the relative alignment and gap spacing 112 between the two lens elements 102. 106. Therefore, the actuator/driver method can be tailored to the particular needs of the application, which enables the present innovation to be adapted to many different uses.

Figure 12:
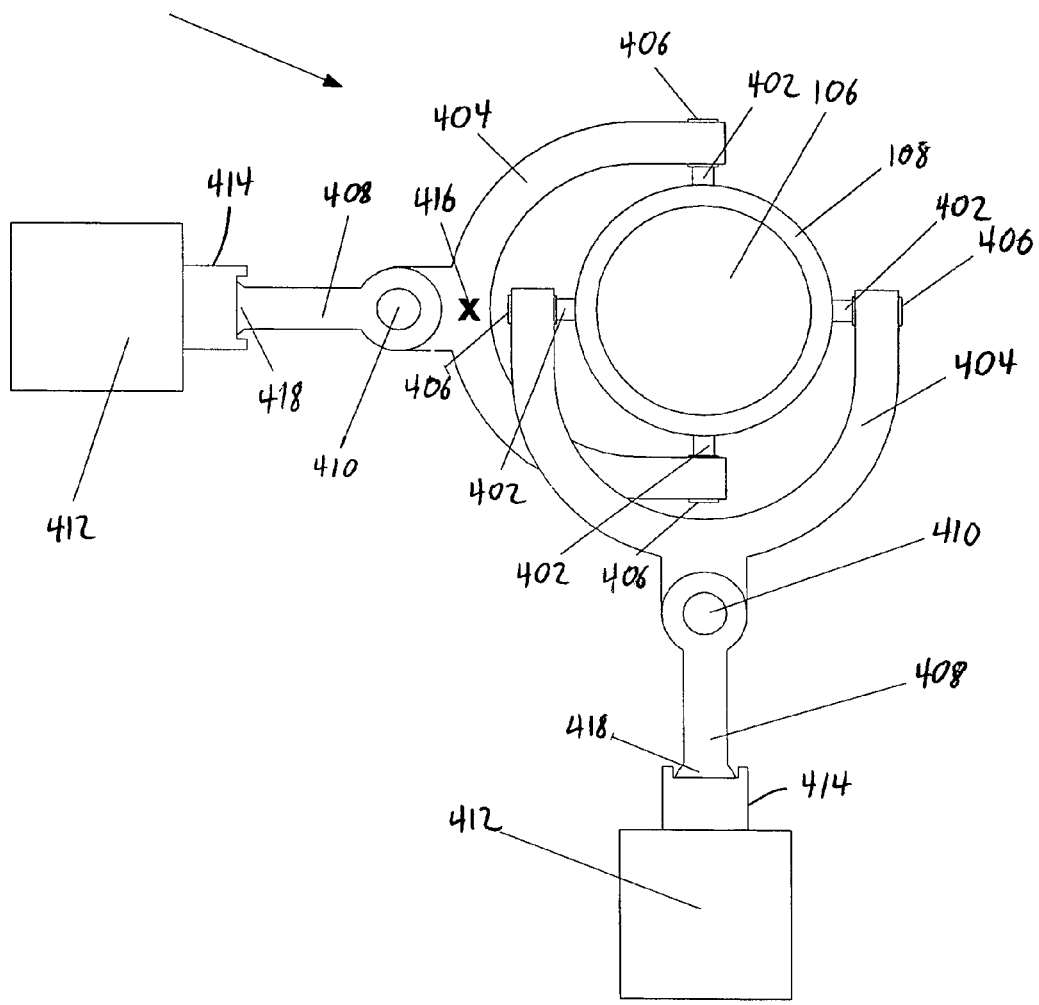
FIG. 12 is a plan view of a gimbal for a precision optical light beam scanner according to an embodiment of the present invention.

One actuator/driver method, including the linkage connecting the primary force generator to the movable lens unit, is shown in FIG. 12. This particular method may be used where rapid and precise positioning and/or continuous scanning is required and space limitations for the scanning unit are not severe. The electromechanical driving system and the lens unit referred to generally as 400 in FIG. 12 are shown in plan view. The lens ring 108 is attached to the movable lens element 106. Four pins 402 are inserted into lens ring 108 in a press fit so they remain rigid and are spaced at 90° intervals around the periphery of the ring 108. Yokes 404 are attached to the pins 402 via bearings 406 leaving the lens ring 108 free to rotate easily within the yokes 404. Short mechanical linkage elements 408 are attached to the yokes 404 with a swivel bearing 410 allowing rotation between the yoke 404 and the mechanical linkage 408. The mechanical linkage elements 408 have spherical ball tips on the ends that are attached to a driver rod connected to the force generators 412. The linkage elements 408 can rotate freely in the ends of driver rods 414. The primary force generators 412 will operate in a push-pull mode supplying the necessary force through the mechanical linkages 408 and yokes 404 to the lens ring 108. The force generators 412 (or driver actuators) mentioned previously are included amongst those that may be used.

A force is applied at 416 to maintain the lens unit in compression. This force may simply be a tension spring attached to the bottom of the yoke 404 and a base plate (not shown) on which the entire beam scanning unit is mounted. It is noted that the compressive force is actually transferred through yoke 404 to pins 402 attached to lens ring 108. This insures that this force is applied fairly uniformly over the entire surface area of the gap at all times.

In this embodiment of the lens unit, a bellows (residing below lens ring 108 and hidden from view) will be attached to the base plate and lens ring 108. Stainless steel bellows or other metallic constructions are extremely resistant to twisting about an axis that is normal to the view shown in FIG. 12. Therefore, as lens ring 108 is driven over the entire range of motion it will be prevented from twisting (or rotating within the plane of FIG. 12) by the bellows. However, it can rotate freely about the two orthogonal axes determined by the pins 402 that are collinear along a diameter of lens ring 108.

This driver design demonstrates an essential feature that must be included in any driver system used with the present innovation, e.g. movement of the moveable lens 106. Care has been taken to insure that no significant torques will be imposed on the lens ring 108 during operation of the driver that would tend to perturb the uniformity or symmetry of the lubricated gap 112 between the lens elements 102, 106. The driver design shown in FIG. 12 accomplishes this by the bearing points in the mechanical linkage at 406, 410 and 418. In essence, the movable lens element 2 must not be inhibited from following the constraint imposed by the underlying stationary spherical surface as it is otherwise displaced to form the optical wedge. A thorough design will account for any forces that may act to cause separation of the lens elements 102, 106 during motion and insure that the compressive loading is sufficient to counterbalance said forces.

The movable lens element and associated lens ring (e.g. lens element 106 and lens ring 108 in FIG. 6) will be firmly bonded together in most lens units. This is not always necessary or even desirable in some driver systems. For example, if for reasons of spatial constraints it is required to use a structure for imparting motion to the movable lens element 106 that is in effect a two-axis gimbaled system, where the gimbal axes pass through the center of curvature of the stationary lens element, then the movable lens element must not be rigidly attached to the lens ring. To do so would over-constrain the motion of the movable lens element 106.

Figure 13:
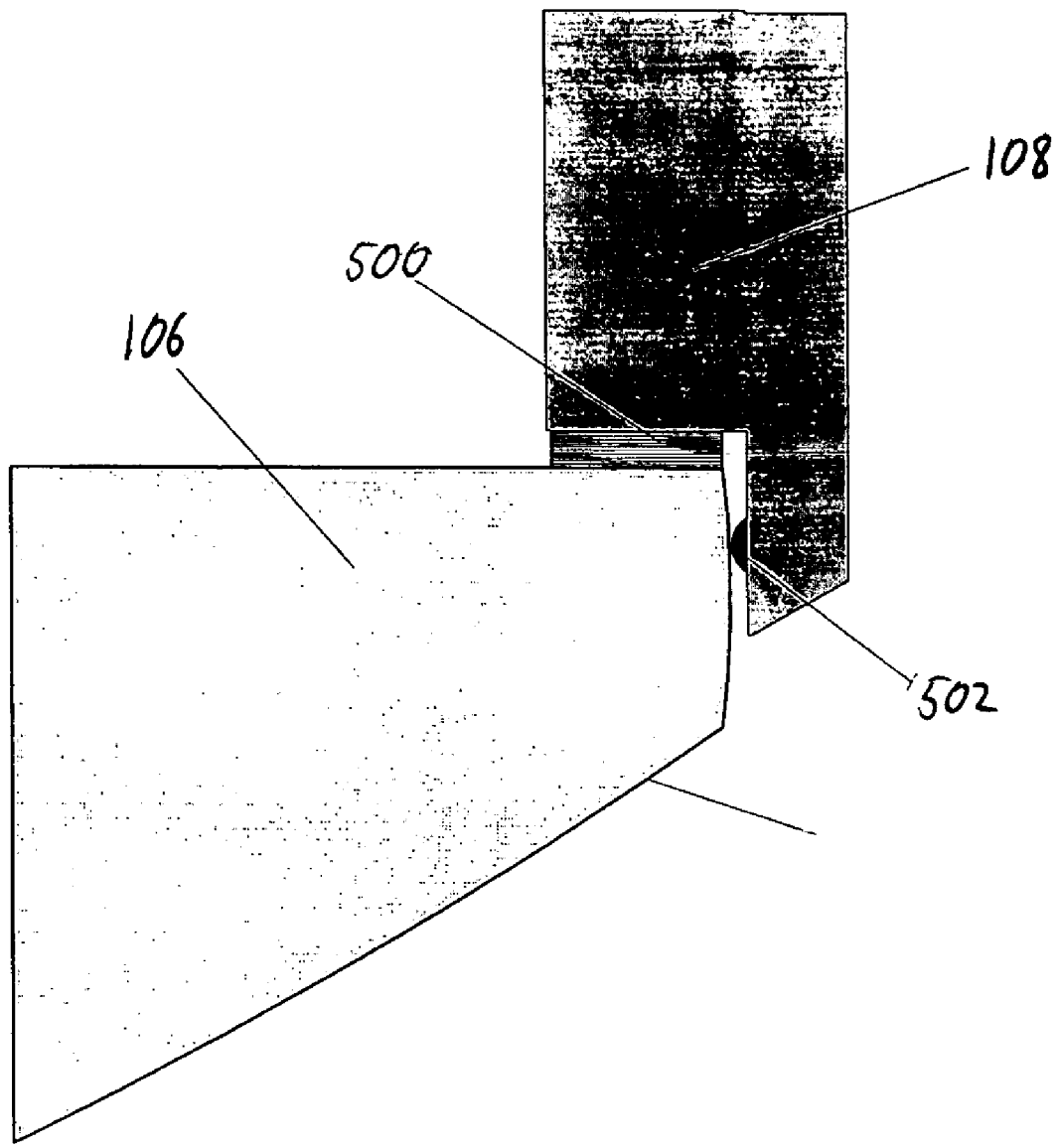
FIG. 13 is a partial view of a lens ring to lens attachment according to an embodiment of the present invention.

A solution to this problem is described in reference to FIG. 13. A portion of a convex lens element 106 and the lens ring 108 are shown in partial cross-section. The lens ring 108 is assumed to be rigidly attached to a two-axis gimbaled system (not shown). The required compressive force is applied by a wavey spring 500 (other types such as compression springs symmetrically placed around the periphery of the lens ring would work equally well) as shown and lens element 106 is free to rotate slightly within the lens ring 108 while being constrained by ball bearings 502. The rotation within the lens ring 108 allows the convex spherical surface 118 to precisely track the underlying concave surface 116 as the movable lens element 106 is displaced. This alleviates an alignment precision requirement between the gimbaled support structure and the center of curvature of the concave lens spherical surface that would be difficult if not impossible to maintain.

The foregoing actuator/driver methods both provide the two important features needed to apply this refractive beam steering innovation, namely, a means to provide a compressive load to the system comprising the lens unit and lubricated gap with O-ring spacer and noninterference with the constrained motion of the movable lens element on the spherical surface of the fixed lens element. It is to be understood that many other driver methods, other than those described herein, may be applied that incorporate these two essential features in application of the method disclosed in the present innovation to refractively steer a light beam.

A preferred embodiment of the present innovation has a single fixed lens element and a single movable lens element. During the displacement of the movable lens element some amount of torque will be transferred to the supporting structure of the lens unit. Some applications are particularly sensitive to such torques as for example self-guided missiles that may employ optical beam steering systems. These applications would benefit from a steering system that reduces torques that are transferred to the missile airframe from optical guidance systems. Such torques can be reduced significantly in the present innovation by employing a means to simultaneously move both lens elements in opposite directions when forming the optical wedge. Thus, the torques from the motion of the two lens elements could be made equal and opposite with respect to an axis of rotation going through the center of mass of the missile for example. This low torque lens unit would clearly be more complicated mechanically, but may be advantageous in the missile application cited.

It will be apparent to those skilled in the art that there are many variations that can be envisioned in the application of this basic concept. The O-ring may consist of various elastomeric materials that would in general be compatible with the optical fluid used in the lubricated gap. The spacer element (i.e. the O-ring) does not necessarily have to have a circular cross-section. It could be elliptical, square, or rectangular for example. In addition one or more spacer rings may be used to space and seal the lubricated gap. For example, one ring may be of a firmer, i.e. high durometer, substance to set the gap spacing and another, which is approximately concentric with it, but either larger or smaller in diameter, may be a softer material to provide additional sealing. It is also apparent that the lens elements may consist of a wide variety of commonly used materials for the transport of light beams. Such materials variations are considered to lie within the overall scope of the basic concept. Finally the lens elements shown in these examples are spherical in nature, although it is clearly evident that the concept can be applied to cylindrical lens elements as well.

Another variation is use of a spacer ring the does not have a uniform cross-section, but may consist of thinner and thicker cross-sections. In addition the spacer ring may be placed in a captivating ring groove in segments leaving spaces around the periphery such that the lubricant cannot be said to be captivated. In such a case the spacer ring or spacer segments bear the primary responsibility for maintaining the uniformity and stability of the gap spacing. Such a gap is likely to be less stable than when the spacer ring completely captivates the optical fluid.

While the specific embodiments have been illustrated and described, numerous modifications come to mind without significantly departing from the spirit of the invention, and the scope of protection is only limited by the scope of the accompanying claims.

What is claimed is:

1. An apparatus for steering a light beam comprising:
   a first lens element having a convex lens surface;
   a second lens element having a concave lens surface, the concave lens surface placed adjacent the convex lens surface of the first lens element;
   a spacer element placed between the convex lens surface and the concave lens surface for maintaining the first and second lens elements at a fixed distance from each other and to define a generally incompressible gap between the first and second lens elements yet allowing the first and second lens elements to move with respect to one another;
   a lubricative optical fluid disposed within the gap; and
   wherein the spacer element performs to generally captivate the optical fluid in the locations it is placed.

2. The apparatus of claim 1 wherein the spacer element is a continuous O-ring having a circular cross-section that generally seals the optical fluid within the gap.

3. The apparatus of claim 1 wherein the spacer element is a segmented spacer element wherein the segments are placed at intervals generally near the periphery of the first lens element.

4. The apparatus of claim 1 wherein the spacer element is maintained in a fixed position within a groove disposed within a first lens element holder.

5. The apparatus of claim 1 wherein:
   the lens surface of the first lens element that is opposite the convex lens surface is a planar lens surface; and
   the lens surface of the second lens element that is opposite the concave lens surface is also a planar lens surface.

6. The apparatus of claim 1 wherein the first lens element is mounted within a lens ring, the ring being movable by an actuator to move the first lens element with respect to the second lens element in order to direct a light beam in a particular direction.

7. The apparatus of claim 1 wherein a compressive force is applied to force the first and second lens elements toward each other.

8. The apparatus of claim 1 wherein the optical fluid has a different refractive index than that of the first and second lens elements.

9. The apparatus of claim 1 wherein the first lens element and the second lens element each have a different refractive index.

10. The apparatus of claim 1 wherein the lens radii of curvature of the first and second lens elements are not equal.

11. The apparatus of claim 1 further comprising a third lens element having a concave lens surface and wherein the first lens element has a second convex lens surface opposite its first convex lens surface, the second convex lens surface of the first lens element being placed in proximity to the concave lens surface of the third lens element.

12. The apparatus of claim 11 wherein a spacer element is placed between the first lens element and the third lens element to hold a quantity of lubricative fluid therebetween and to define a generally incompressible gap between the first and third lens elements yet allowing the first and third lens elements to move with respect to one another.

13. The apparatus of claim 12 wherein the spacer element is a continuous O-ring that seals a quantity of lubricative optical fluid between the first and third lens elements.

14. The apparatus of claim 1 further comprising a flexible seal that seals the area between the first and second lens elements to seal in a secondary volume of optical fluid surrounding the O-ring.

15. A method of setting a gap between movable lens elements in an apparatus for steering a light beam comprising the steps of:
 placing a first lens element having a convex surface in proximity to a concave lens surface of a second lens element with shims of a desired gap thickness therebetween;
 compressing the lens elements a slight amount as the spacer element comes into contact with the lens surfaces;
 removing the shims from between the first and second lens elements;
 filling the volume between the first and second lens elements and the spacer member with additional optical fluid through a fill line; and
 venting air from the volume between the first and second lens elements and the spacer member through a vent line.

16. The method of claim 15 further comprising the step of:
 placing an amount of optical fluid between the first and second lens elements before bringing them into the proximity of one another.

17. The method of claim 15 further comprising the step of:
 while under compression, bonding a lens ring to the first lens element using a low-shrinkage bonding agent.

18. The method of claim 15 further comprising the step of:
 attaching a sealed container of pressurized optical fluid to one of the fill and vent lines to maintain the constant gap thickness during expansion and contraction of the optical fluid.

19. An apparatus for steering a light beam comprising:
 a first lens element having first and second, opposed convex lens surfaces;
 a second lens element having a concave lens surface, the concave lens surface placed adjacent the first convex lens surface of the first lens element;
 a third lens element having a concave lens surface, the concave lens surface placed adjacent the second convex lens surface of the first lens element;
 a first spacer element placed between the first convex lens surface and the concave lens surface of the second lens element for maintaining the first and second lens elements at a fixed distance from each other and for maintaining a lubricative optical fluid within a space defined by the first spacer element, and wherein the first and second lens elements, the first spacer element and the optical fluid produce a generally incompressible gap between the first and second lens elements while allowing the first and second lens elements to move with respect to one another;
 a second spacer element placed between the second convex lens surface of the first lens element and the concave lens surface of the third lens element for maintaining the first and third lens elements at a fixed distance from each other and for maintaining a lubricative optical fluid within a space defined by the second spacer element, and wherein the first and third lens elements, the second spacer element and the optical fluid produce a generally incompressible gap between the first and third lens elements while allowing the first and third lens elements to move with respect to one another.

20. The apparatus of claim 19 wherein the spacer elements are O-rings having a circular cross-section.

21. The apparatus of claim 20 wherein the first and second O-rings are maintained in a fixed position within grooves disposed within a first lens element holder and a third lens element holder, respectively.

22. The apparatus of claim 19 wherein the lens surface of the second lens element that is opposite its concave lens surface thereof is a planar lens surface and the lens surface of the third lens element that is opposite the concave lens surface thereof is a planar lens surface.

23. The apparatus of claim 19 wherein the optical fluid has the same refractive index as the first, second and third lens elements.

24. The apparatus of claim 19 wherein the first lens element, the second lens element and the third lens element each have different refractive indices.

25. An apparatus for steering a light beam comprising:
 a first lens element having a convex lens surface;
 a second lens element having a concave lens surface, the concave lens surface placed adjacent the convex lens surface of the first lens element;
 a spacer element placed between the convex lens surface and the concave lens surface for maintaining the first and second lens elements at a fixed distance from each other and to define a generally incompressible gap between the first and second lens elements yet allowing the first and second lens elements to move with respect to one another;
 a lubricative optical fluid disposed within the gap; and
 wherein the spacer element is mounted in a lens ring holder and contacts the lens surface of only one of the first and second lens elements.

* * * * *